United States Patent [19]
Glennon

[11] Patent Number: 6,018,233
[45] Date of Patent: Jan. 25, 2000

[54] REDUNDANT STARTING/GENERATING SYSTEM

[75] Inventor: Timonthy F. Glennon, Rockford, Ill.

[73] Assignee: Sundstrand Corporation, Rockford, Ill.

[21] Appl. No.: 08/885,718

[22] Filed: Jun. 30, 1997

[51] Int. Cl.[7] .............................. H02P 9/08; F02N 11/00
[52] U.S. Cl. ........................................ 322/22; 290/36 R
[58] Field of Search .................................. 290/4 C, 4 D, 290/31, 36 R, 38 R, 47; 322/7, 9, 22, 23, 24

[56] References Cited

U.S. PATENT DOCUMENTS

| | | | |
|---|---|---|---|
| 2,908,776 | 10/1959 | Nolden et al. | 200/4 |
| 3,132,297 | 5/1964 | Erikson | 322/59 |
| 3,519,843 | 7/1970 | Trautman | 307/65 |
| 3,555,290 | 1/1971 | Ellermeyer | 306/65 |
| 4,356,402 | 10/1982 | Morimoto et al. | 307/19 |
| 4,403,292 | 9/1983 | Ejzak et al. | 364/492 |
| 4,456,830 | 6/1984 | Cronin | 290/27 |
| 4,467,220 | 8/1984 | Page | 307/19 |
| 4,638,175 | 1/1987 | Bradford et al. | 307/64 |
| 4,659,942 | 4/1987 | Volp | 307/19 |
| 4,743,776 | 5/1988 | Baehler et al. | 290/31 |
| 4,786,852 | 11/1988 | Cook | 322/10 |
| 4,830,412 | 5/1989 | Raad et al. | 290/31 |
| 4,862,342 | 8/1989 | Dhyanchand et al. | 363/40 |
| 4,967,096 | 10/1990 | Diemer et al. | 307/19 |
| 5,012,177 | 4/1991 | Dhyanchand et al. | 322/10 |
| 5,036,267 | 7/1991 | Markunas et al. | 322/10 |
| 5,055,764 | 10/1991 | Rozman et al. | 322/10 |
| 5,266,838 | 11/1993 | Gerner | 307/19 |
| 5,309,081 | 5/1994 | Shah et al. | 322/10 |
| 5,691,625 | 11/1997 | Kumar et al. | 322/20 |

FOREIGN PATENT DOCUMENTS

WO90/08893  8/1990  European Pat. Off. .

OTHER PUBLICATIONS

PCT Search Report for International Application No.: PCT/US98/11125.

Primary Examiner—Nicholas Ponomarenko
Attorney, Agent, or Firm—Marshall, O'Toole, Gerstein, Murray & Borun

[57] ABSTRACT

A power conversion system allows for redundant starting and generating functions and eliminates equipment normally found in a conventional system so that size and weight are reduced.

22 Claims, 6 Drawing Sheets

REDUNDANT STARTING/GENERATING SYSTEM

TECHNICAL FIELD

The present invention relates generally to starting/generating systems, and more particularly to a starting/generating system for an aircraft.

BACKGROUND ART

In a medium sized aircraft, such as a 100 passenger aircraft, two aircraft engines and an auxiliary power unit (APU) are often provided. Conventionally, the main engines are started by air turbine starters, requiring valves, ducts and other equipment in the tightly packed engine nacelle. Further, the APU is typically started by a DC starter motor which only provides a useful function for a very short period of time over each APU engine cycle. Also, the starter motor is a high maintenance item owing to the use of brushes and an overrunning clutch therein.

Of late, there has been a desire to provide variable frequency power generation capability on the main engines. When the power rating of the generator is sufficient, main engine electric start becomes an option. This capability allows significant amounts of equipment to be removed from the aircraft, particularly in tightly packed areas, such as the engine nacelle.

SUMMARY OF INVENTION

A starting/generating system allows for redundant starting and generating functions and eliminates equipment normally found in a conventional system so that size and weight are reduced.

More particularly, a power conversion system includes a pair of prime movers, a pair of generators each coupled to a prime mover, a load bus and a power source. A power converter interconnects the generators, the load bus and the power source. The power converter is operable in a starting mode of operation such that power from the power source is conditioned and supplied to one of the generators to cause the generator to operate as a motor and start the prime mover coupled thereto. The power converter is subsequently operable to provide power developed by the one generator to the remaining generator to cause the remaining generator to operate as a motor and thereby start the prime mover coupled thereto.

Preferably, the power converter is further operable in a generating mode to condition power developed by at least one of the generators and to deliver such conditioned power to the load bus. Also preferably, at least one electrically driven pump is coupled to and receives power from the load bus.

Still further in accordance with the preferred embodiment, the prime movers comprise aircraft engines. In alternative embodiments, the power source comprises a battery or an AC power source.

In addition, the load bus may receive variable frequency power from at least one of the generators.

Also, the power converter preferably comprises a plurality of identical converter units and the power conversion system further includes additional load buses, a first switch matrix coupled between the generators and the converter units and a second switch matrix coupled between the converter units and the load buses. Also in accordance with the preferred embodiment, the power source comprises a battery and each converter unit comprises a rectifier circuit coupled between the first switch matrix and a DC link, an inverter coupled between the DC link and the second switch matrix and a bidirectional converter coupled between the battery and the DC link.

In accordance with yet another aspect of the present invention, a power conversion system is provided for an aircraft having first and second generators coupled to first and second aircraft engines, respectively, and a third generator coupled to an auxiliary power unit (APU). The aircraft further includes a first load bus coupled to an electrically driven hydraulic pump and a second, variable frequency bus. The power conversion system includes a first switch matrix coupled to the generators, first through third power converter units coupled to the first switch matrix and a second switch matrix coupled between the first through third power converter units and the load buses. A DC power source is coupled to the power converter units and a supervisory control is operable in a starting mode to cause any one of the power converter units to provide conditioned power obtained from the DC power source to the third generator to cause such generator to operate as a motor and start the APU. The supervisory control is subsequently operable to cause any one of the power converter units to provide power developed by the third generator to one of the remaining generators to cause such generator to operate as a motor and thereby start the aircraft engine coupled thereto. The control is further operable in a generating mode to provide power developed by the generators to the load buses.

In accordance with yet another aspect of the present invention, a power conversion system for an aircraft having first and second generators coupled to first and second aircraft engines, respectively, and a third generator coupled to an APU wherein the aircraft further includes a first set of load buses coupled to electrically motor driven hydraulic pumps, a 400 Hz. bus, a second set of load buses coupled to variable frequency loads and a DC bus coupled to DC loads includes a first switch matrix coupled to the generators. Identical first through third power converter units are coupled to the first switch matrix and a second switch matrix is coupled between the first through third power converter units and the first and second sets of load buses. The system further includes a battery and a control for controlling the first and second switch matrices and the power converter units. The control is operable in a starting mode to cause any one of the power converter units to provide conditioned power obtained from the battery to the third generator to cause such generator to operate as a motor and start the APU. The control is subsequently operable to cause any one of the power converter units to provide power developed by the third generator sequentially to the remaining generators to cause the remaining generators to operate as motors and thereby sequentially start the aircraft engines. The control is further operable in a generating mode to provide conditioned AC power to the first set of power buses, variable frequency AC power to the second set of load buses, DC power to the DC bus and 400 Hz. power to the 400 Hz. bus. Each power converter unit comprises a rectifier circuit coupled between the first switch matrix and a DC link, an inverter coupled between the DC link and the second switch matrix and a bidirectional converter coupled between the battery and the DC link.

Other aspects and advantages of the present invention will become apparent upon consideration of the following drawings and detailed description.

DESCRIPTION OF THE PREFERRED EMBODIMENT

Figure 1:
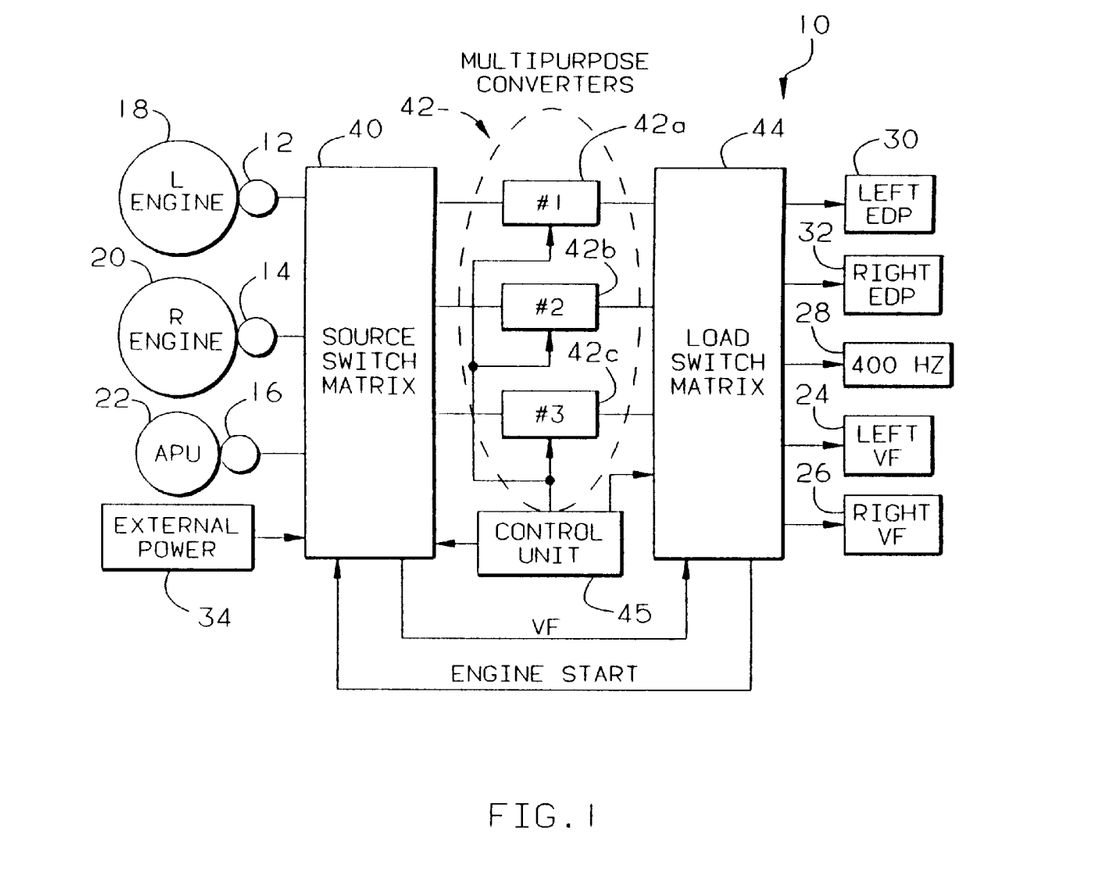
FIG. 1 comprises a block diagram of a power conversion system according to the present invention.

Referring now to FIG. 1, a power conversion system 10 according to the present invention converts electric power produced by left, right and APU generators 12, 14, 16 driven by a first (or left) aircraft engine 18, a second (or right) aircraft engine 20 and an auxiliary engine power unit (APU) 22, respectively, into power for various loads. In the preferred embodiment, the power conversion system 10 develops power for loads including variable frequency power on left and right variable frequency channels 24, 26, respectively, and constant frequency 400 Hz. AC power on a 400 Hz. constant frequency bus 28. Still further, AC power at a controlled voltage and frequency is developed for electrically driven hydraulic pumps (EDP's) 30, 32.

The generators 12, 14 and 16 may, for example, have 60–120 kw power ratings. The APU 22 may drive the generator 16 at a constant speed so that 400 Hz. fixed frequency AC power is obtained. If desired, a wider frequency range of, for example, 380–480 Hz. may be obtained from the generator 16 if advantageous to the APU 22.

In addition to the foregoing, external power may be obtained from an external power source 34, and the external power may be converted by the power conversion system 10 for one or more of the loads 24–32 or to accomplish starting. The system 10 may be connected to the power source 34 by one of two plugs, one for connection to a 400 Hz. source and the other for connection to a 50/60 Hz. source (preferably used for starting only).

The power conversion system 10 includes a source switch matrix 40, a number of multi-purpose converter units 42 and a load switch matrix 44. In the preferred embodiment, there are three multi-purpose converter units 42a–42c, although a different number of such converter units may be used instead, such as two.

The source switch matrix 40 and/or the load switch matrix 44 may be implemented by conventional contactors of the single-throw variety, double-throw center off or special varieties.

Each converter unit includes a converter control and all of the converter controls are directed by a supervisory control unit 45, which also includes a contactor control for the contactors in the matrices 40 and 44. The supervisory control unit 45 may be a stand-alone device, or may be implemented in a vehicle management system redundant computer.

In the preferred embodiment, the multi-purpose converter units 42a–42c are identical to one another, although this need not be the case. During operation in a starting mode, power from any source can be made available through any converter to start either engine 18, 20 or the APU 22. Significantly, all three multi-purpose converters 42a–42c would have to fail before engine start was not possible.

One possible start sequence is to start the APU 22 using power supplied by a battery or power from the external power source 34. In this case, the battery power or external power is converted by one or more of the power converter units 42a–42c into appropriately conditioned power which is supplied by the load switch matrix 44 and the source switch matrix 40 to the generator 16. The generator 16 is then operated as a starting motor to bring the APU 22 up to self-sustaining speed. The generator 16 thereafter provides power to one or more of the multi-purpose converter units 42a–42c. The converter unit(s) 42a–42c deliver appropriately conditioned power via the load switch matrix 44 and the source switch matrix 40 to each of the generators 12, 14 to cause the generators to operate as motors and bring the associated engines 18, 20 up to self-sustaining speed. Typically, the engines 18, 20 are started sequentially rather than simultaneously.

Once the engines are started, operation in a generating mode can commence wherein power developed by the generators 12, 14 and/or 16 is provided by the source switch matrix 40 to the power converter units 42a–42c. The units 42a–42c, in any order or any combination, can provide power to one or more of the loads via the load switch matrix 44, as desired. During operation in the generating mode, variable frequency power is provided to each multi-purpose converter unit 42-42c and to the left and right variable frequency channels 24, 26.

Figure 2:
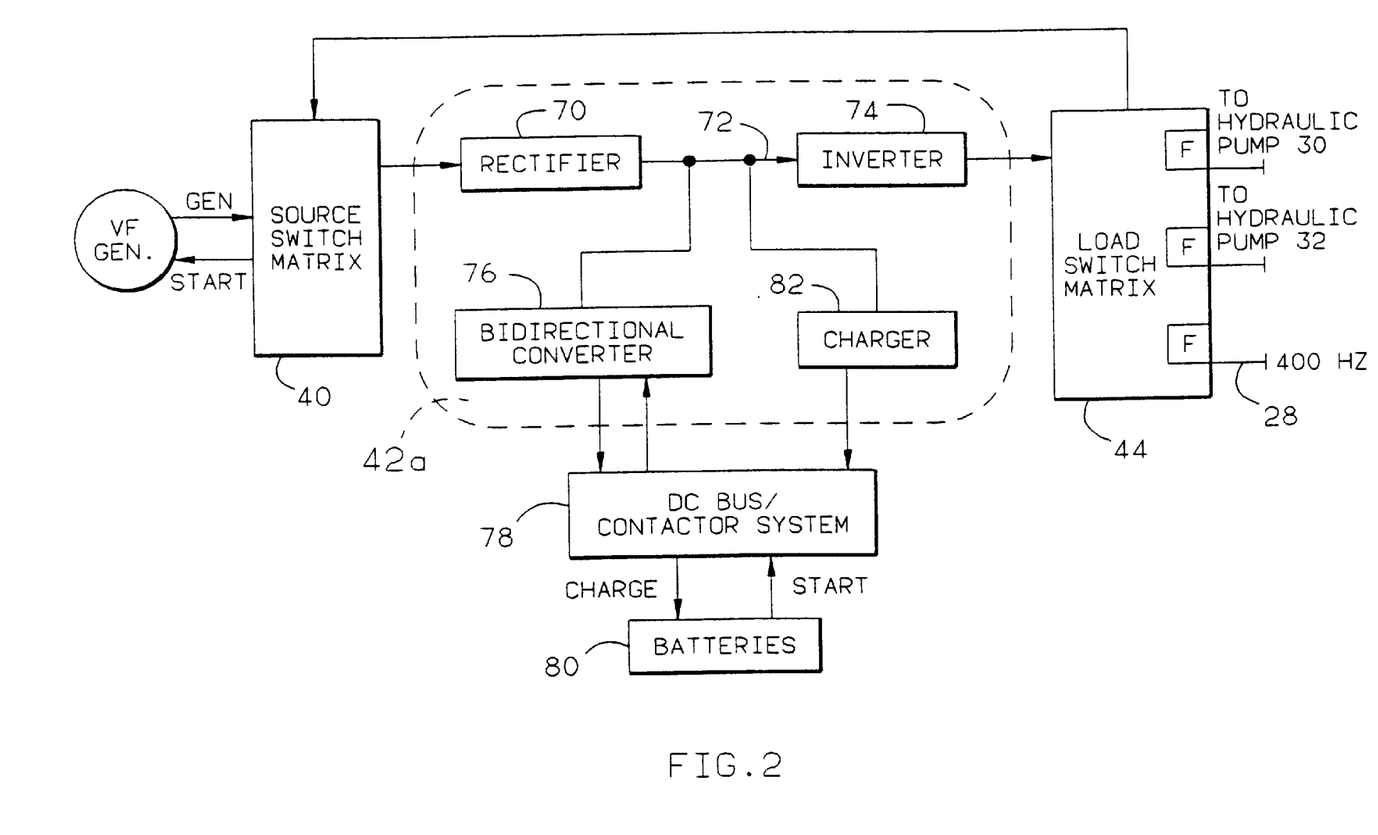
FIG. 2 comprises a block diagram illustrating one of the power converters of FIG. 1 in greater detail.

FIG. 2 illustrates the multi-purpose converter unit 42a in greater detail, it being understood that, in the preferred embodiment, the converter units 42b and 42c are identical thereto. Also shown are the source switch matrix 40 and the load switch matrix 44. It should be understood that each of the switch matrices 40, 44 includes appropriate filtering for EMI suppression. Alternatively, EMI suppression filtering could be accomplished by the multi-purpose converter units. Also, the load switch matrix 44 includes filters for conditioning the power provided to the electrically driven pumps 30, 32 and for conditioning the power supplied over the constant frequency bus 28. These filters are of conventional design and hence are not described further herein.

It should be noted that the multi-purpose converter units 42, 44, the load switch matrix 44 and the load filters can be incorporated into a single compartmentalized assembly enclosure, if desired.

The multi-purpose converter unit 42a includes a rectifier circuit 70 which is coupled to a DC link 72. The rectifier circuit 70 rectifies the single or polyphase power provided by the switch matrix 40 and develops DC voltage at a level of, for example, approximately 270 volts on the DC link 72. An inverter 74, which may be of the single phase or polyphase type, converts the DC power into AC power and delivers same to the load switch matrix 44. If the inverter 74 is to supply the constant frequency bus 28, the inverter 74 develops such constant frequency power. On the other hand, if the inverter 74 is to operate one or both of the EDP's 30, 32, the inverter 74 develops AC motor drive waveforms for the EDP's in a fashion evident to one of ordinary skill in the art. When power is to be provided to one or more of the generators 12, 14 and 16 for starting, the inverter 74 develops AC motor drive waveforms suitable for engine starting.

A bidirectional converter 76 is coupled to the DC link 72 and a DC bus/contactor system 78 is coupled to the bidirectional converter 76. The DC bus/contactor system 78 is further coupled to one or more batteries 80 and a charger 82, wherein the latter is also coupled to the DC link 72.

The bidirectional converter 76 shifts the level of the voltage on the DC link to a lower level of, for example, 28 volts DC, thereby accomplishing the function of a conventional transformer-rectifier unit (TRU). DC power is thus made available for DC loads over the DC bus/contactor system 78 during operation in the generating mode. In addition, battery charging may be accomplished by the battery charger 82 during operation in the generating mode. In this manner, independent control over the output voltage of the converter 76 and the battery charging function is possible. If desired, the TRU function and the battery charging function can be combined in a single unit, with independent control of voltage and the charge function.

During a normal start sequence without external power, the batteries 80 provide DC power to the DC bus/contactor system 78 and the bidirectional converter 76 is operated to develop 270 volt DC power on the DC link 72. The DC power is converted into AC power suitable for APU engine starting by the inverter 74. The AC power is supplied by the load switch matrix 44 to the source switch matrix 40 and thence to the appropriate generator 16.

Figure 3:
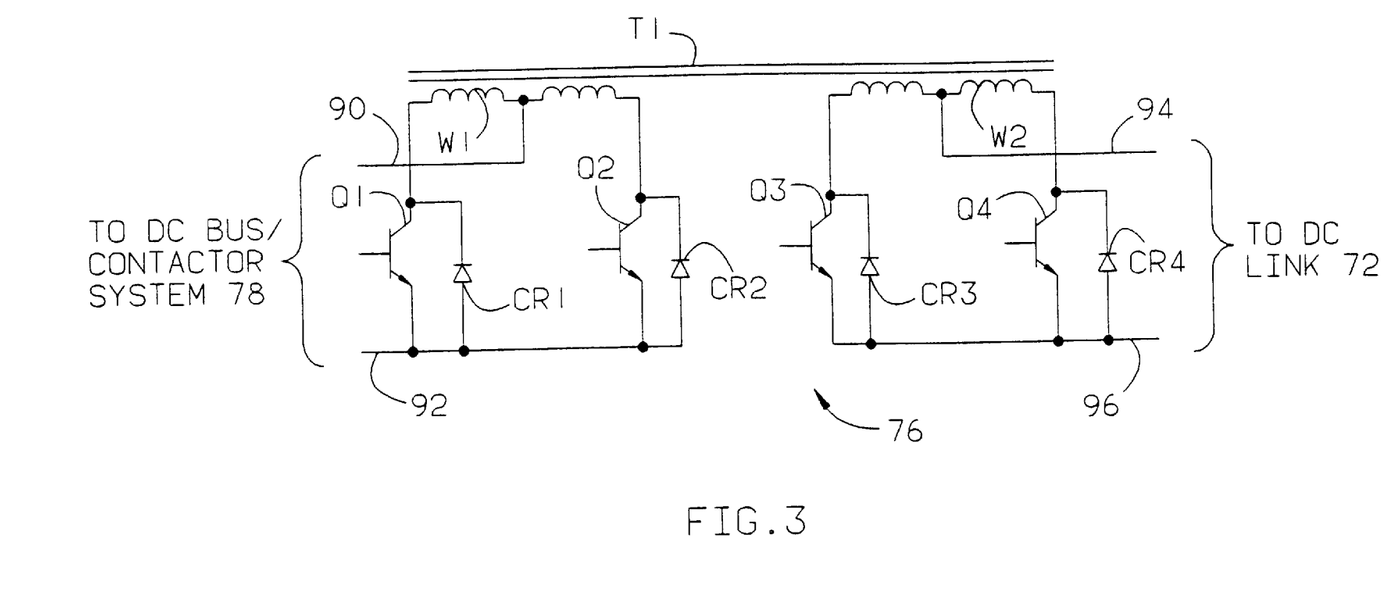
FIG. 3 is a simplified schematic diagram of the bidirectional converter of FIG. 2.

FIG. 3 illustrates the bi-directional converter 76 in greater detail. The converter 76 includes first and second pairs of controllable power switches Q1, Q2 and Q3, Q4. The controllable power switches Q1–Q4 may comprise power MOSFET arrays, IGBT's or any other controllable switches of suitable power rating. A flyback/rectifier diode CR1–CR4 is coupled across each of the switches Q1–Q4, respectively. The power switches Q1 and Q2 are coupled to first and second ends, respectively, of a first winding W1 of a transformer T1. The switches Q3 and Q4 are coupled to first and second ends of a second winding W2 of the transformer T1, which is magnetically linked with the first winding W1. A mid-tap of the first winding W1 and the power switches Q1, Q2 and diodes D1, D2 are coupled by conductors 90, 92 to the DC bus/contactor system 78. A mid-tap of the second winding W2 and the power switches Q3, Q4 and diodes D3, D4 are coupled by conductors 94, 96 to the DC link 72.

Figure 4:
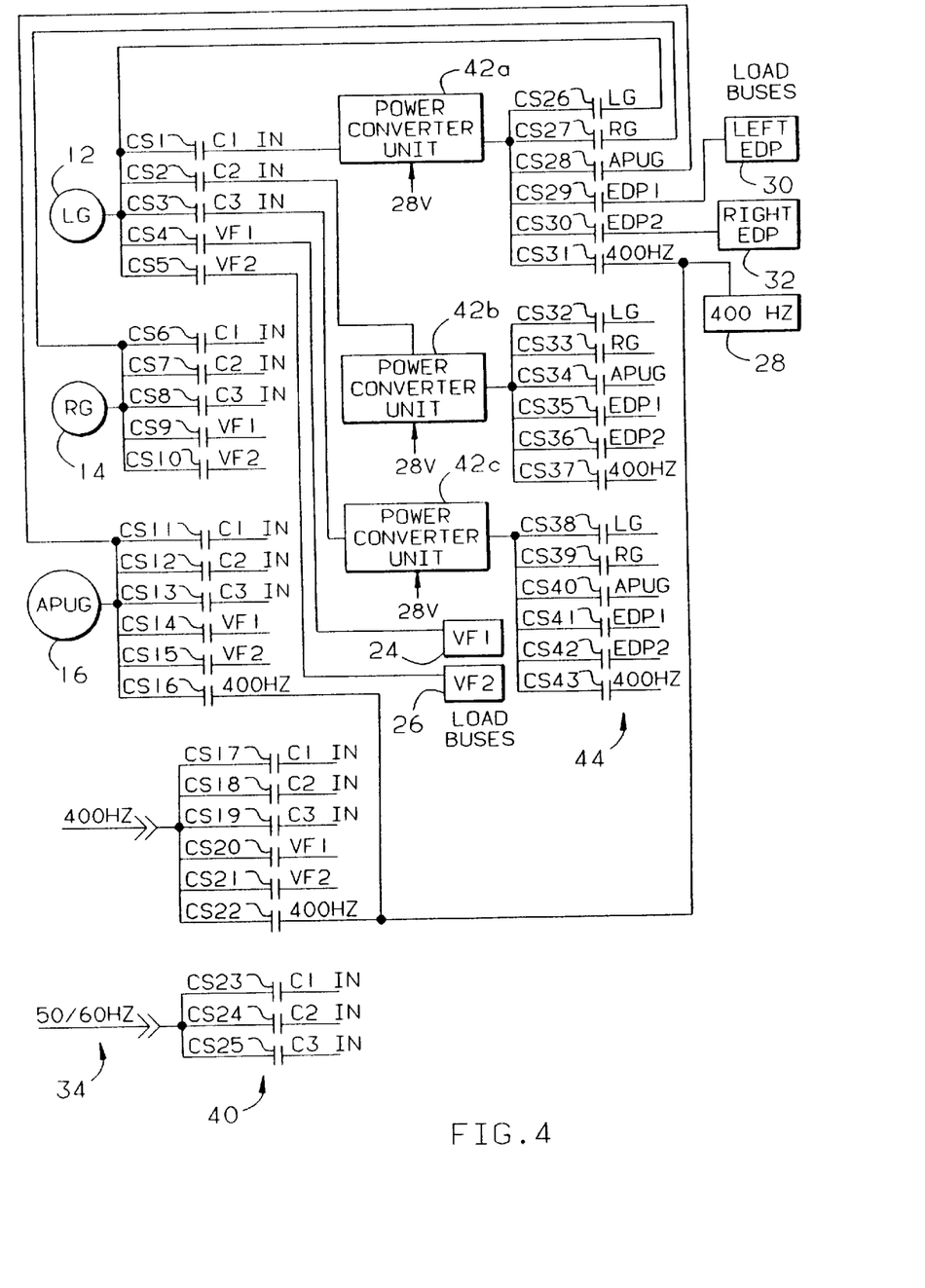
FIGS. 4–6 are simplified combined schematic and block diagrams of alternative embodiments of the present invention.

FIG. 4 illustrates one embodiment of the present invention which provides a high level of redundancy. In this embodiment 50/60 Hz. and 400 Hz. external power sources are utilized. Alternatively, only one may be used or other power source(s) may be substituted therefor. Also, while the FIGS. comprise single line diagrams, it should be understood that the various devices may develop/condition single or polyphase power (three-phase being typical). In the latter case, each line and contactor set shown in FIG. 4 (and FIGS. 5 and 6) represents the appropriate number of lines and contactor sets as should be evident to one of ordinary skill in the art.

The source switch matrix 40 comprises single-throw contactor sets CS1–CS25 whereas the load switch matrix 44 comprises single-throw contactor sets CS26–CS43. The interconnection of the contactor sets CS1–CS5 between the left generator 12, the converter units 42a–42c and the variable frequency channels 24, 26 are illustrated. Legends C1in, C2in, C3in, VF1 and VF2 are utilized to denote the various connections between the contactor sets CS1–CS5 and the above-mentioned elements. Corresponding legends are utilized to denote the interconnection of the contactor sets CS6–CS10, CS11–CS15, CS17–CS21 and CS23–CS25 to the various elements. The contactor set CS16 is connected between the APU generator 16 and the 400 Hz. channel. The 400 Hz. external power source is connected by the contactor sets CS22 to the 400 Hz. channel 28 as well. As noted above, only one of these external power sources may instead be used, or a different power source, if desired.

The contactor sets CS26, CS27 and CS28 are connected between the output of the power converter unit 42a and the left generator 12, the right generator 14 and the APU generator 16, respectively. The contactor sets CS29, CS30 and CS31 are connected between the output of the power converter unit 42a and the left and right EDP's 30, 32 and the constant frequency bus 28, respectively. As was the case with the contactor sets of the source switch matrix 40, legends are used to denote the interconnection of the contactor sets CS32–CS43 between the outputs of the power converter units 42b, 42c and the above-noted elements.

As should be evident from FIG. 4, any source of power can be connected through any power converter unit 42a–42c to any generator 12–16 or any load, as required. Thus, for example, power developed by the left generator 12 may be supplied through the contactor set CS1 to the power converter unit 42a and the power developed by such unit 42a may be provided to the remaining generator(s) 14 or 16 or to any of the loads 24–32. The power converter unit 42a is commanded by the supervisory control unit 45 to supply power of appropriate waveshape to the load connected thereto, as noted above.

As a further example, the left generator 12 may supply power to the variable frequency channels 24, 26 directly through the contactor sets CS4 and/or CS5. Still further, power may be supplied to one or both of the variable frequency channels 24, 26 by the generator 12, and further, power may be provided through the contactor set CS1 to the converter 42a and thence to one or both of the EDP's 30, 32.

Figure 5:
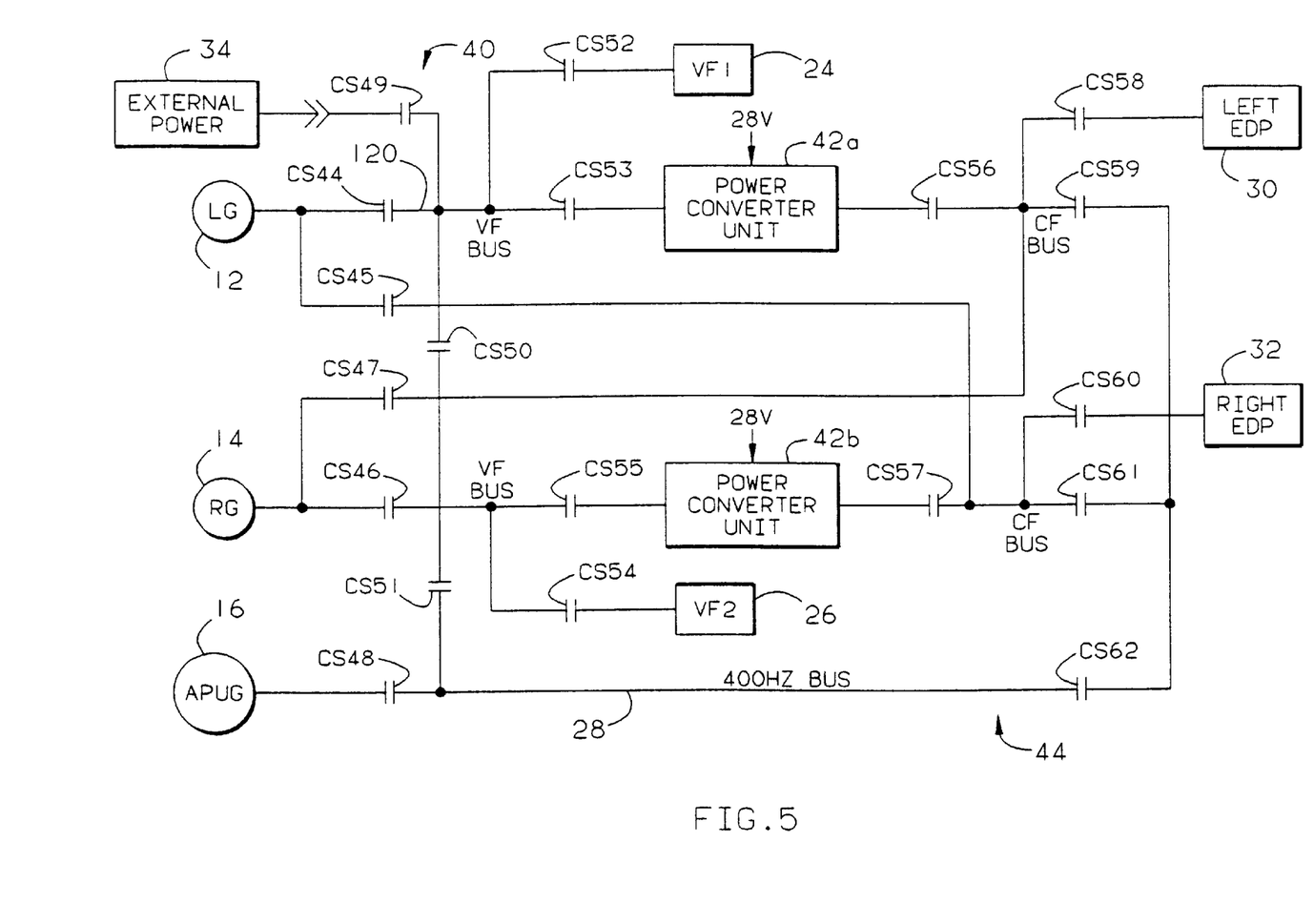

If desired, the number of contactors in the source switch matrix 40 and the load switch matrix 44 can be reduced, albeit with some sacrifice in system redundancy. FIG. 5 illustrates one such possible configuration utilizing only two power converter units 42a and 42b. Single-throw contactor sets CS44–CS55 comprise the source switch matrix 40 whereas remaining single-throw contactors CS56–CS62 comprise the load switch matrix 44. It can be seen that any engine can be started from any power source through either converter 42a or 42b through appropriate control of the contactor sets CS44–CS62. For example, power developed by the generator 12 may be supplied through contactor sets CS44 and CS53 to the power converter unit 42a. Power developed by the power converter unit 42a may be supplied to the left EDP 30 through contactor sets CS56 and CS58 or to the right EDP 32 through the contactor sets CS56, CS59, CS61 and CS60. Alternatively, power may be supplied by the power converter unit 42a to the APU generator 16 through the contactor sets CS56, CS59, CS62 and CS48. Other source/load combinations can be achieved through closure of appropriate contacts seen in FIG. 5, as should be evident to one of ordinary skill in the art.

If the total magnitude of loads coupled to the constant frequency bus 28 is small, a small power converter could be added to the system to permit 400 Hz. power conversion capability from either or both of the variable frequency channels 24, 26.

In addition to the foregoing, the APU generator 16 may receive power from the external power source 34 through closed contactor sets CS49 and CS53, the power converter unit 42a and closed contactor sets CS56, CS59, CS62 and CS48. Alternatively, power can be routed through the power converter unit 42b and closed contactor sets CS49, CS50, CS55, CS57, CS61, CS62 and CS48.

Still further, power can be obtained from the right generator 14 for the APU generator 16 through the power converter unit 42a and closed contactor sets CS47, CS50, CS53, CS56, CS59, CS62 and CS48. Power for the APU generator 16 could be obtained from the right generator 14 alternatively through the power converter unit 42b through closed contactor sets CS47, CS55, CS57, CS61, CS62 and CS48.

It is possible to achieve a further simplification in the circuit of FIG. 5 (and FIGS. 4 and 6) while obtaining the same level of redundancy by substituting double-throw contactor sets for pairs of single-throw contactor sets. This could only be accomplished, however, when the contactor sets of the pair are to be operated in a mutually exclusive fashion, i.e., when one contactor set is to be closed while the other is open and vice versa. Thus, for example, the contactor sets CS52 and CS53 can be replaced by a single double-throw contactor set provided that power on a line 120 is to be supplied in a mutually exclusive fashion to one of the variable frequency channel 24 or the power converter 42a, but not both simultaneously.

Figure 6:
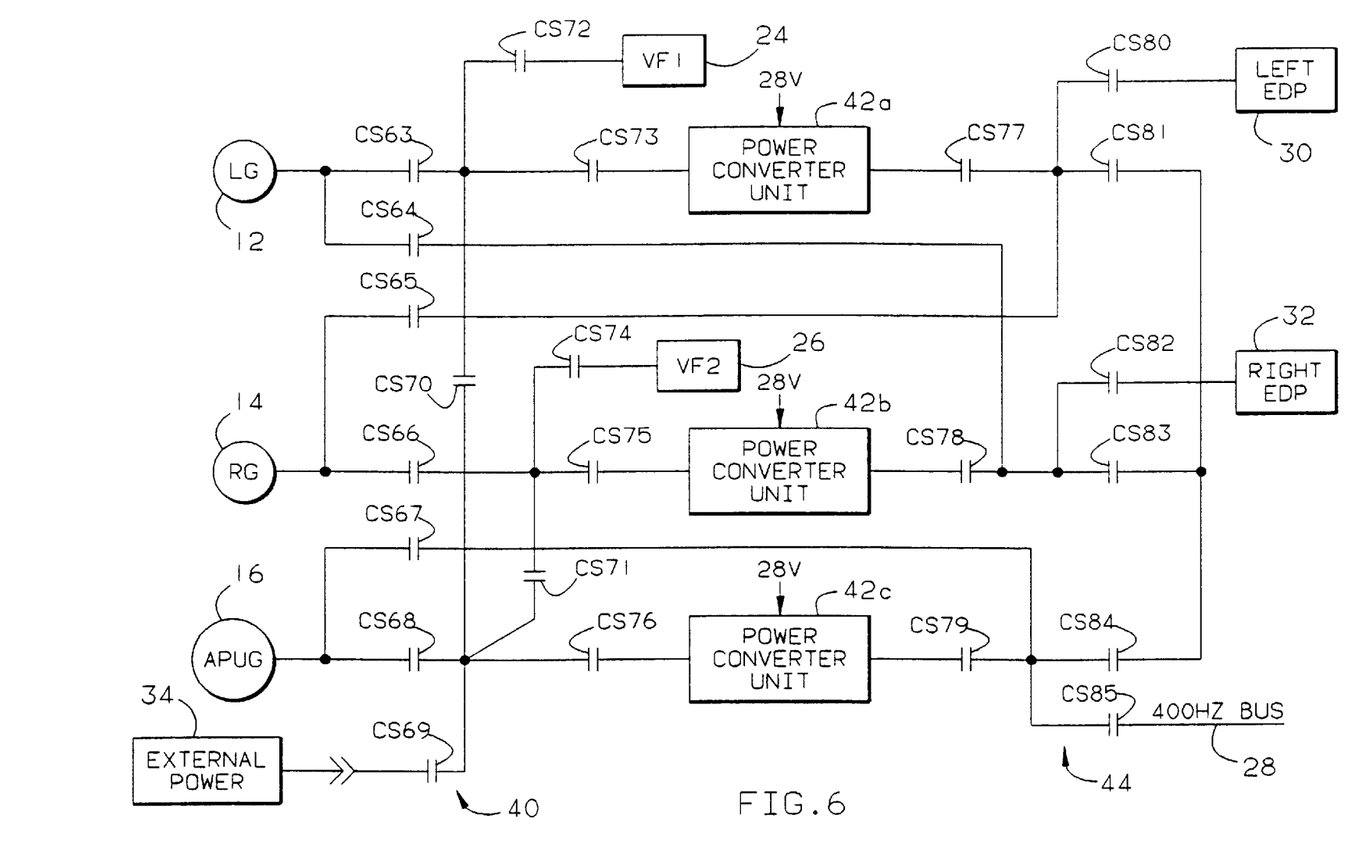

FIG. 6 illustrates a further embodiment according to the present invention which differs from that shown in FIG. 5 through the addition of the third power converter unit 42c. Single-throw contactor sets CS63–CS76 comprise the source switch matrix 40 whereas single-throw contactor sets CS77–CS85 comprise the load switch matrix 44. In this embodiment, any generator 12, 14 or 16 or any load 24, 26, 28, 30 or 32 can receive power from any power converter unit 42a–42c. As in the previous embodiment where contactors are operated in mutually exclusive fashion, the single-throw contactor sets could be replaced by double-throw contactor sets, if desired. Thus, for example, the contactor sets CS63 and CS64 can be replaced by a single double-throw contactor set. Other pairs of single-throw contactor sets that may be replaced by a single set of double-throw contactor sets include contactor sets: CS65, CS66; CS67, CS68; CS70, CS71; CS74, CS75; CS72, CS73; CS77, CS80; CS78, CS82; CS79, CS85; and CS83, CS84.

As should be evident from the foregoing, other contactor arrangements could alternatively be used to provide the required level of redundancy.

The system of the present invention provides for redundant starting and generating operation, and further reduces system size and weight. Reliability is improved through the elimination of the DC starter generator coupled to the APU and hydraulic pump life is improved (up to five times) owing to the driving of such pumps using controlled speed electric motors.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

I claim:

1. A power conversion system, comprising:
   a pair of prime movers;
   a pair of generators each coupled to a prime mover;
   a load bus;
   a power source;
   a pair of power converter units interconnecting the generators, the load bus and the power source; and
   a supervisory control operable in a starting mode to cause either of the power converter units to condition power from either of the power source and one of the generators and provide such conditioned power to another of the generators to cause such other generator to operate as a motor and thereby start the prime mover coupled thereto.

2. The power conversion system of claim 1, wherein each power converter unit is further operable in a generating mode to condition power developed by at least one of the generators and to deliver such conditioned power to the load bus.

3. The power conversion system of claim 1, wherein at least one electrically driven pump is coupled to and receives power from the load bus.

4. The power conversion system of claim 3, wherein the prime movers comprise aircraft engines.

5. The power conversion system of claim 1, wherein the power source comprises a battery.

6. The power conversion system of claim 1, wherein the power source comprises an AC power source.

7. The power conversion system of claim 1, wherein the load bus receives variable frequency power from at least one of the generators.

8. The power conversion system of claim 1, wherein the power converter units are identical and further including additional load buses, a first switch matrix coupled between the generators and the converter units and a second switch matrix coupled between the converter units and the load buses.

9. The power conversion system of claim 8, wherein the power source comprises a battery and each converter unit comprises a rectifier circuit coupled between the first switch matrix and a DC link, an inverter coupled between the DC link and the second switch matrix and a bidirectional converter coupled between the battery and the DC link.

10. A power conversion system for an aircraft having first and second generators coupled to first and second aircraft engines, respectively, and a third generator coupled to an auxiliary power unit (APU) wherein the aircraft further includes a first load bus coupled to an electrically driven hydraulic pump and a second, variable frequency bus, comprising:
   a first switch matrix coupled to the generators;
   first through third power converter units coupled to the first switch matrix;
   a second switch matrix coupled between the first through third power converter units and the load buses;
   a DC power source coupled to the power converter units;
   a supervisory control operable in a starting mode to cause any one of the power converter units to provide conditioned power obtained from the DC power source to the third generator to cause the third generator to operate as a motor and start the APU and subsequently operable to cause any one of the power converter units to provide power developed by the third generator to one of the first and second generators to cause such generator to operate as a motor and thereby start the aircraft engine coupled thereto and further operable in a generating mode to provide power developed by the generators to the load buses.

11. The power conversion system of claim 10, wherein the supervisory control comprises a contactor control for the first and second switch matrices.

12. The power conversion system of claim 11, wherein the power converter units are identical to one another.

13. The power conversion system of claim 12, wherein the DC power source comprises a battery.

14. The power conversion system of claim 13, wherein each power converter unit comprises a rectifier circuit coupled between the first switch matrix and a DC link, an inverter coupled between the DC link and the second switch matrix and a bidirectional converter coupled between the battery and the DC link.

15. The power conversion system of claim 14, wherein the bidirectional converter includes a charger for the battery.

16. The power conversion system of claim 14, wherein each power converter unit includes a charger for the battery wherein the charger is separate from the bidirectional converter.

17. The power conversion system of claim 14, further including a DC bus and contactors operable to connect the DC bus to the bidirectional converter.

18. The power conversion system of claim 10, further including an external AC power source coupled to the first switch matrix.

19. A power conversion system for an aircraft having first and second generators coupled to first and second aircraft engines, respectively, and a third generator coupled to an auxiliary power unit (APU) wherein the aircraft further includes a first set of load buses coupled to electrically driven hydraulic pumps, a 400 Hz. bus, a second set of load buses coupled to variable frequency loads and a DC bus coupled to DC loads, comprising:

a first switch matrix coupled to the generators;

identical first through third power converter units coupled to the first switch matrix;

a second switch matrix coupled between the first through third power converter units and the first and second sets of load buses;

a battery; and a supervisory control for controlling the first and second switch matrices and the power converter units and operable in a starting mode to cause any one of the power converter units to provide conditioned power obtained from the battery to the third generator to cause such generator to operate as a motor and start the APU and subsequently operable to cause any one of the power converter units to provide power developed by the third generator sequentially to the remaining generators to cause the remaining generators to operate as motors and thereby sequentially start the aircraft engines and further operable in a generating mode to cause the generators to provide conditioned AC power to the first set of power buses, variable frequency AC power to the second set of load buses, DC power to the DC bus and 400 Hz. power to the 400 Hz. bus;

wherein each power converter unit comprises a rectifier circuit coupled between the first switch matrix and a DC link, an inverter coupled between the DC link and the second switch matrix and a bidirectional converter coupled between the battery and the DC link.

20. The power conversion system of claim 19, wherein the supervisory control comprises a contactor control for the first and second switch matrices.

21. The power conversion system of claim 20, wherein the bidirectional converter includes a charger for the battery.

22. The power conversion system of claim 21, further including an external AC power source coupled to the first switch matrix.

* * * * *